US012607289B2

(12) United States Patent
Musto et al.

(10) Patent No.: US 12,607,289 B2
(45) Date of Patent: Apr. 21, 2026

(54) POWER END OF RECIPROCATING PUMP

(71) Applicant: GD Energy Products, LLC, Tulsa, OK (US)

(72) Inventors: Joshua Andrew Musto, Tulsa, OK (US); Randall Turner Hall, Jr., Claremore, OK (US)

(73) Assignee: GD ENERGY PRODUCTS, LLC, Tulsa, OK (US)

( * ) Notice: Subject to any disclaimer, the term of this patent is extended or adjusted under 35 U.S.C. 154(b) by 315 days.

(21) Appl. No.: 18/360,083

(22) Filed: Jul. 27, 2023

(65) Prior Publication Data

US 2025/0035253 A1     Jan. 30, 2025

(51) Int. Cl.
    *F16M 1/021*    (2006.01)
    *E21B 43/26*    (2006.01)
    *F04B 19/22*    (2006.01)

(52) U.S. Cl.
    CPC ......... *F16M 1/021* (2013.01); *E21B 43/2607* (2020.05); *F04B 19/22* (2013.01)

(58) Field of Classification Search
    CPC ...... F16M 1/021; E21B 43/2607; F04B 19/22
    See application file for complete search history.

(56) References Cited

U.S. PATENT DOCUMENTS

| | | | |
|---|---|---|---|
| 1,490,294 A | 4/1924 | Steffen | |
| 3,186,063 A | 6/1965 | Dopp | |

| | | | | |
|---|---|---|---|---|
| 4,477,237 A | 10/1984 | Grable | |
| D759,728 S | 6/2016 | Byrne et al. | |
| D791,192 S | 7/2017 | Byrne et al. | |
| D791,193 S | 7/2017 | Byrne et al. | |
| 10,087,992 B2 | 10/2018 | Bayyouk et al. | |
| 10,352,321 B2 | 7/2019 | Byrne et al. | |
| 10,393,182 B2 * | 8/2019 | Byrne | F04B 53/16 |
| D870,156 S | 12/2019 | Byrne et al. | |
| D870,157 S | 12/2019 | Byrne et al. | |
| 10,663,071 B2 | 5/2020 | Bayyouk et al. | |
| 10,677,244 B2 | 6/2020 | Byrne et al. | |
| 10,781,803 B2 * | 9/2020 | Kumar | F04B 1/0404 |
| 10,871,227 B1 * | 12/2020 | Belshan | F04B 1/053 |
| 11,009,024 B1 * | 5/2021 | Buckley | F04B 1/2064 |
| 11,204,030 B2 * | 12/2021 | Kumar | F04B 53/16 |
| 11,480,170 B2 | 10/2022 | Byrne et al. | |
| 11,773,843 B2 * | 10/2023 | Pham | F04B 53/16 |
| | | | 417/521 |

(Continued)

FOREIGN PATENT DOCUMENTS

| | | |
|---|---|---|
| CN | 107234358 A | 10/2017 |

*Primary Examiner* — Terrell L Mckinnon
*Assistant Examiner* — Ding Y Tan
(74) *Attorney, Agent, or Firm* — Edell, Shapiro & Finnan, LLC

(57) ABSTRACT

A power end frame of a reciprocating pump includes a plate and a ring configured to couple to the plate in an assembled configuration of the power end frame. The ring and the plate cooperatively define a compartment of an interior of the power end frame configured to enclose a crankshaft of the reciprocating pump, the ring includes a base surface and a flange extending from the base surface such that an interface surface of the flange is offset from the base surface, the base surface faces the compartment of the power end frame, and the interface surface is configured to abut the plate in the assembled configuration.

20 Claims, 11 Drawing Sheets

(56)  References Cited

U.S. PATENT DOCUMENTS

| | | | | |
|---|---|---|---|---|
| 11,788,527 | B2 * | 10/2023 | Nowell ................. | F04B 53/007 |
| | | | | 417/571 |
| 2010/0129249 | A1 | 5/2010 | Bianchi et al. | |
| 2016/0025089 | A1 * | 1/2016 | Kumar ..................... | F16C 9/02 |
| | | | | 92/161 |
| 2019/0277279 | A1 | 9/2019 | Byrne et al. | |
| 2019/0277341 | A1 | 9/2019 | Byrne et al. | |
| 2020/0400132 | A1 * | 12/2020 | Kumar ................. | F04B 39/122 |
| 2021/0123434 | A1 * | 4/2021 | Cui ....................... | F04B 1/0439 |
| 2021/0123435 | A1 * | 4/2021 | Cui ....................... | F04B 53/006 |
| 2021/0270264 | A1 * | 9/2021 | Byrne .................. | F04B 53/006 |
| 2022/0106951 | A1 * | 4/2022 | Foster ................... | F04B 15/02 |
| 2022/0282719 | A1 * | 9/2022 | Barnhouse ........... | F04B 53/168 |
| 2024/0309740 | A1 * | 9/2024 | Kumar ............... | E21B 43/2607 |

* cited by examiner

100

104

106

102

108

POWER END OF RECIPROCATING PUMP

TECHNICAL FIELD

The present disclosure relates to the field of high pressure reciprocating pumps and, in particular, to a power end of high pressure reciprocating pumps.

BACKGROUND

High pressure reciprocating pumps are often used to deliver high pressure fluids during earth drilling operations. Generally, a reciprocating pump includes a power end and a fluid end. The power end can generate forces sufficient to cause the fluid end to deliver high pressure fluids to earth drilling operations. For example, the power end includes a crankshaft that drives a plurality of reciprocating plungers or pistons near or within the fluid end to pump fluid at high pressure. The power end also includes a frame that supports and encloses components of the power end, such as the crank shaft. The frame is arranged to withstand stress (e.g., a mechanically induced stress, a hydraulically induced stress) being produced during operation of the reciprocating pump to enable desirable performance of the reciprocating pump.

SUMMARY

The present application relates to a power end frame of a reciprocating pump. The techniques discussed herein may be embodied as a power end frame, a method for assembling a reciprocating pump, and a ring of a power end frame.

More specifically, in accordance with at least one embodiment, the present application is directed to a power end frame of a reciprocating pump including a plate and a ring. The ring is configured to couple to the plate in an assembled configuration of the power end frame so that the ring and the plate cooperatively define a compartment of an interior of the power end frame configured to enclose a crankshaft of the reciprocating pump. The ring includes a base surface and a flange extending from the base surface such that an interface surface of the flange is offset from the base surface. The base surface faces the compartment of the power end frame, and the interface surface is configured to abut the plate in the assembled configuration.

In accordance with another embodiment, the present application is directed to a method of manufacturing a power end frame of a reciprocating pump. The method includes providing a ring with a flange extending from a base surface of the ring, abutting the flange of the ring against a plate, and applying a weld along the flange to secure the ring and the plate to one another such that the base surface is positioned in a compartment of an interior of the power end frame.

In accordance with yet another embodiment, the present application is directed to a ring of a power end frame of a reciprocating pump. The ring includes a base surface and a flange extending from the base surface to form a recess positioned in a compartment of an interior of the power end frame. The flange includes an interface surface configured to abut a plate of the power end frame, and the interface surface is offset from the base surface.

The foregoing advantages and features will become evident in view of the drawings and detailed description.

BRIEF DESCRIPTION OF THE DRAWINGS

To complete the description and in order to provide for a better understanding of the present application, a set of drawings is provided. The drawings form an integral part of the description and illustrate embodiments of the present application, which should not be interpreted as restricting the scope of the disclosure, but just as examples. The drawings comprise the following figures.

Like reference numerals have been used to identify like elements throughout this disclosure.

DETAILED DESCRIPTION

The following description is not to be taken in a limiting sense but is given solely for the purpose of describing the broad principles of the disclosure. Embodiments of the disclosure will be described by way of example, with reference to the above-mentioned drawings showing elements and results according to the present disclosure.

Generally, the present application is directed to a power end frame of a reciprocating pump. The power end frame includes a plate and a ring coupled to one another to define a compartment of an interior of the power end frame. The ring includes a base surface facing the compartment, as well as a flange extending from the base surface to offset an interface surface of the flange from the base surface and to form a recess in the compartment of the power end frame. The plate is configured to abut the interface surface such that the plate and the flange of the ring cooperatively form an exterior groove configured to receive a weld to couple the plate and the ring to one another. The flange enables the weld to be applied away from the recess (e.g., a bend, a curve, a corner), where stress may concentrate during operation of the reciprocating pump. In this manner, stress concentrates away from the weld to maintain application of the weld and therefore a structural integrity of the power end frame. Thus, the flange may improve durability of the power end frame and reduce downtime of the reciprocating pump. Moreover, the position of the weld, as well as the geometry of the plate and ring presented herein, an automated welding process may form the weld around the entire power end frame in a single pass.

Figure 1:
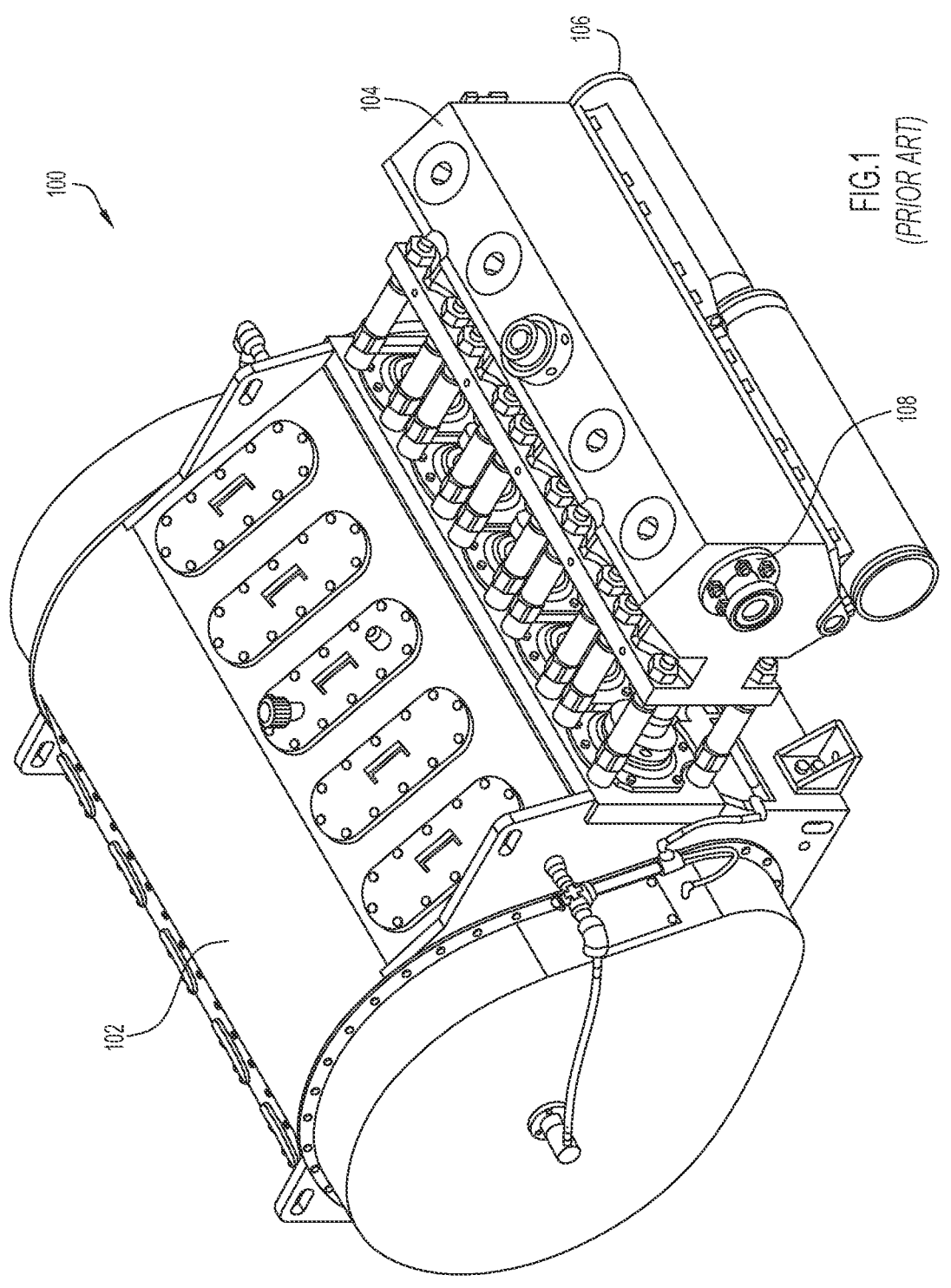
FIG. 1 is a front perspective view of a prior art reciprocating pump including a fluid end and a power end.

Referring to FIG. 1, a prior art reciprocating pump 100 is illustrated. The reciprocating pump 100 includes a power end 102 and a fluid end 104. The power end 102 includes a crankshaft that drives a plurality of reciprocating plungers or pistons (generally referred to as "reciprocating elements") within the fluid end 104 to pump fluid at high pressure (e.g., to cause the fluid end 104 to deliver high pressure fluids to earth drilling operations). For example, the power end 102 may be configured to support hydraulic fracturing (i.e., fracking) operations, where fracking liquid (e.g., a mixture of water and sand) is injected into rock formations at high pressures to allow natural oil and gas to be extracted from the rock formations. However, to be clear, this example is not intended to be limiting, and the present application may be applicable to both fracking and drilling operations, as well as any other suitable operations.

In any case, often, the reciprocating pump 100 may be quite large and may, for example, be supported by a semi-tractor truck ("semi") that can move the reciprocating pump 100 to and from a well. Specifically, in some instances, a semi may move the reciprocating pump 100 off a well to perform maintenance on the reciprocating pump 100. However, a reciprocating pump 100 is typically moved off a well only when a replacement pump (and an associated semi) is available to move into place at the well, which may be rare. Thus, often, the reciprocating pump 100 is taken offline at a well and maintenance is performed while the reciprocating pump 100 remains on the well. If not for this maintenance, the reciprocating pump 100 could operate continuously to extract natural oil and gas (or conduct any other operation). Consequently, any improvements that extend the lifespan of components of the reciprocating pump 100, extend the time between maintenance operations (i.e., between downtime), and/or minimize the time to complete maintenance operations (minimizing downtime) are highly desirable.

Figure 2A:
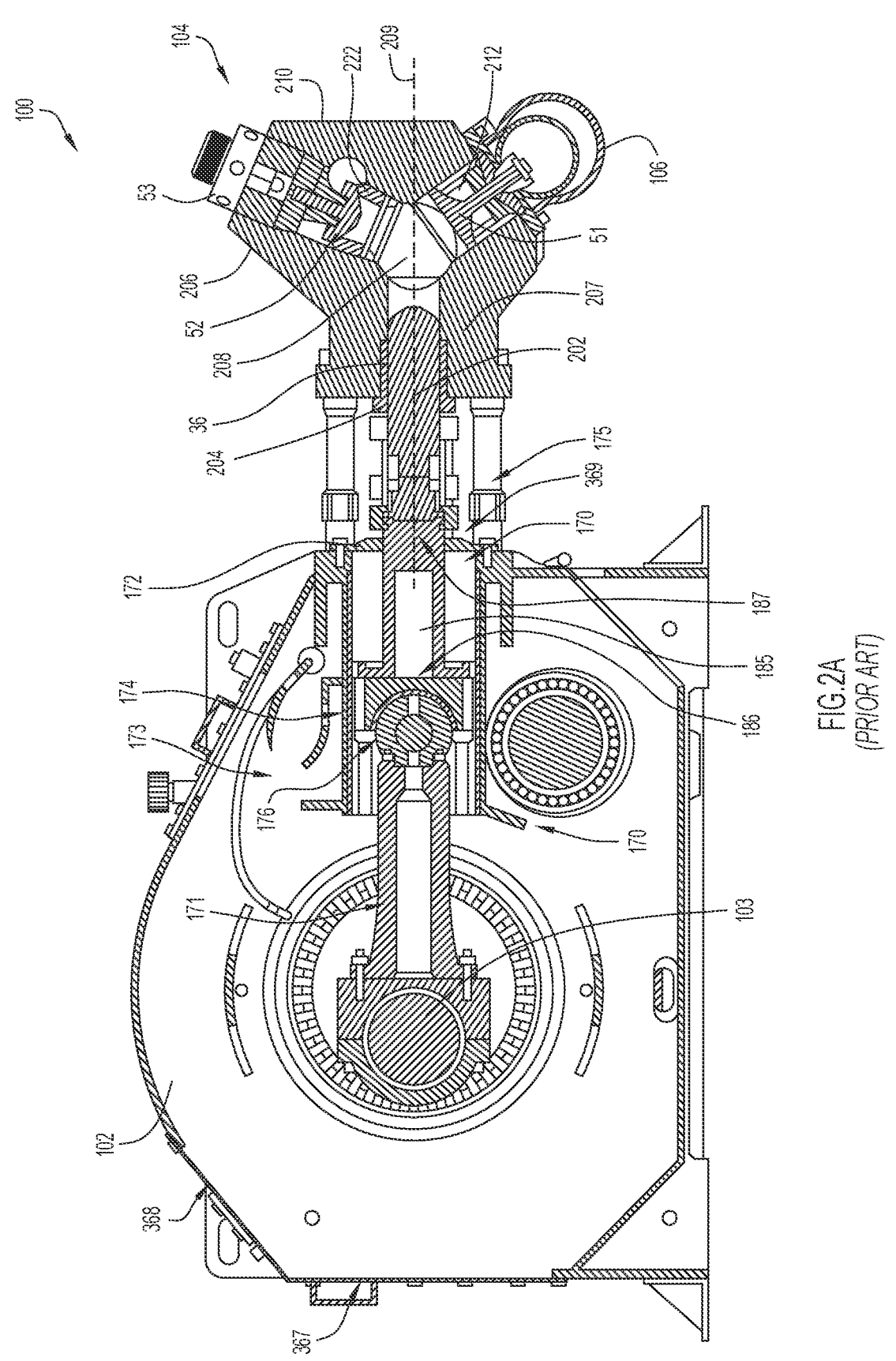
FIG. 2A is a side cross-sectional view of the prior art reciprocating pump of FIG. 1.

Still referring to FIG. 1, but now in combination with FIG. 2A, the reciprocating pump 100 pumps fluid into and out of pumping chambers 208. FIG. 2A shows a side, cross-sectional view of reciprocating pump 100 taken along a central axis 209 of one of the reciprocating elements 202 included in reciprocating pump 100. Thus, FIG. 2A depicts a single pumping chamber 208. However, it should be understood that a fluid end 104 can include multiple pumping chambers 208 arranged side-by-side. In fact, in at least some embodiments (e.g., the embodiment of FIG. 1), a casing 206 of the fluid end 104 forms a plurality of pumping chambers 208, and each pumping chamber 208 includes a reciprocating element 202 that reciprocates within the casing 206. However, side-by-side pumping chambers 208 need not be defined by a single casing 206. For example, in some embodiments, the fluid end 104 may be modular, and different casing segments may house one or more pumping chambers 208. In any case, the one or more pumping chambers 208 are arranged side-by-side so that corresponding conduits are positioned adjacent to each other and generate substantially parallel pumping action. Specifically, with each stroke of the reciprocating element 202, low pressure fluid is drawn into the pumping chamber 208 and high pressure fluid is discharged. Such operation of the reciprocating pump 100, such as movement of the crank-shaft 103, movement of the reciprocating element 202, and/or flow of fluid, may impart stress onto different parts of the power end 102. The stress can affect a structural integrity of the power end 102. Therefore, maintenance operations (e.g., inspection, replacement, repair) may be performed with respect to the power end 102 to ensure continued operation of the reciprocating pump 100.

In various embodiments, the fluid end 104 may be shaped differently and/or have different features, but may still generally perform the same functions, define similar struc-tures, and house similar components. For example, while fluid end 104 includes a first bore 204 that intersects an inlet bore 212 and an outlet bore 222 at skewed angles, other fluid ends may include any number of bores arranged along any desired angle or angles, for example, to intersect bore 204 (and/or an access bore) substantially orthogonally and/or so that two or more bores are substantially coaxial. Generally, bores 212 and 222, as well as any other bores (i.e., segments, conduits, etc.), may intersect to form a pumping chamber 208, may be cylindrical or non-cylindrical, and may define openings at an external surface 210 of the casing 206. Additionally, bores 212 and 222, as well as any other bores (i.e., segments, conduits, etc.), may receive various compo-nents or structures, such as sealing assemblies or compo-nents thereof.

In the depicted embodiment, inlet bore 212 defines a fluid path through the fluid end 104 that connects the pumping chamber 208 to a piping system 106 delivering fluid to the fluid end 104. Meanwhile, outlet bore 222 allows com-pressed fluid to exit the fluid end 104. Thus, in operation, bores 212 and 222 may include valve components 51 and 52, respectively, (e.g., one-way valves) that allow bores 212 and 222 to selectively open and deliver a fluid through the fluid end 104. Typically, valve components 51 in the inlet bore 212 may be secured therein by a piping system 106 (see FIG. 1). Meanwhile, valve components 52 in outlet bore 222 may be secured therein by a closure assembly 53 that, in the prior art example illustrated in FIG. 2A, is removably coupled to the fluid end 104 via threads.

In operation, fluid may enter fluid end 104 via outer openings of inlet bores 212 and exit fluid end 104 via outer openings of outlet bores 222. More specifically, fluid may enter inlet bores 212 via pipes of piping system 106, flow through pumping chamber 208 (due to reciprocation of a reciprocating elements 202), and then through outlet bores 222 into a channel 108 (see FIG. 1). However, piping system 106 and channel 108 are merely example conduits and, in various embodiments, fluid end 104 may receive and dis-charge fluid via any number of pipes and/or conduits, along pathways of any desirable size or shape.

Meanwhile, each of bores 204 defines, at least in part, a cylinder for reciprocating elements 202 and/or connects the casing 206 to a cylinder for reciprocating elements 202. More specifically, in the illustrated embodiment, a casing segment 207 houses a packing assembly 36 configured to seal against a reciprocating element 202 disposed interiorly of the packing assembly 36. Reciprocation of a reciprocating element 202 in or adjacent to bore 204, which may be referred to as a reciprocation bore (or, for fracking applica-tions, a plunger bore), draws fluid into the pumping chamber 208 via inlet bore 212 and pumps the fluid out of the pumping chamber 208 via outlet bore 222. To help provide access to these parts and/or the pumping chamber 208, such as for performing maintenance operations, some fluid ends 104 have access bores that are often aligned with (and sometimes coaxial with) the reciprocating bore 204. Other fluid ends 104 needs not include an access bore and, thus, such an access bore is not illustrated in FIGS. 1 and 2A.

Regardless of whether the fluid end 104 includes an access bore, the packing assembly 36 typically is to be replaced from an outer opening of bore 204 (i.e., a side of bore 204 aligned with the external surface 210 of the casing 206). At the same time, to operate properly, the fluid end 104 is to be securely and stably coupled to the power end 102. Thus, often, with prior art reciprocating pumps like recip-rocating pump 100, the fluid end 104 is directly coupled to the power end 102 with relatively short couplers 175 and at least a portion of the reciprocating pump 100 must be disassembled to access bore 204, e.g., to replace packing assembly 36.

Figure 2B:
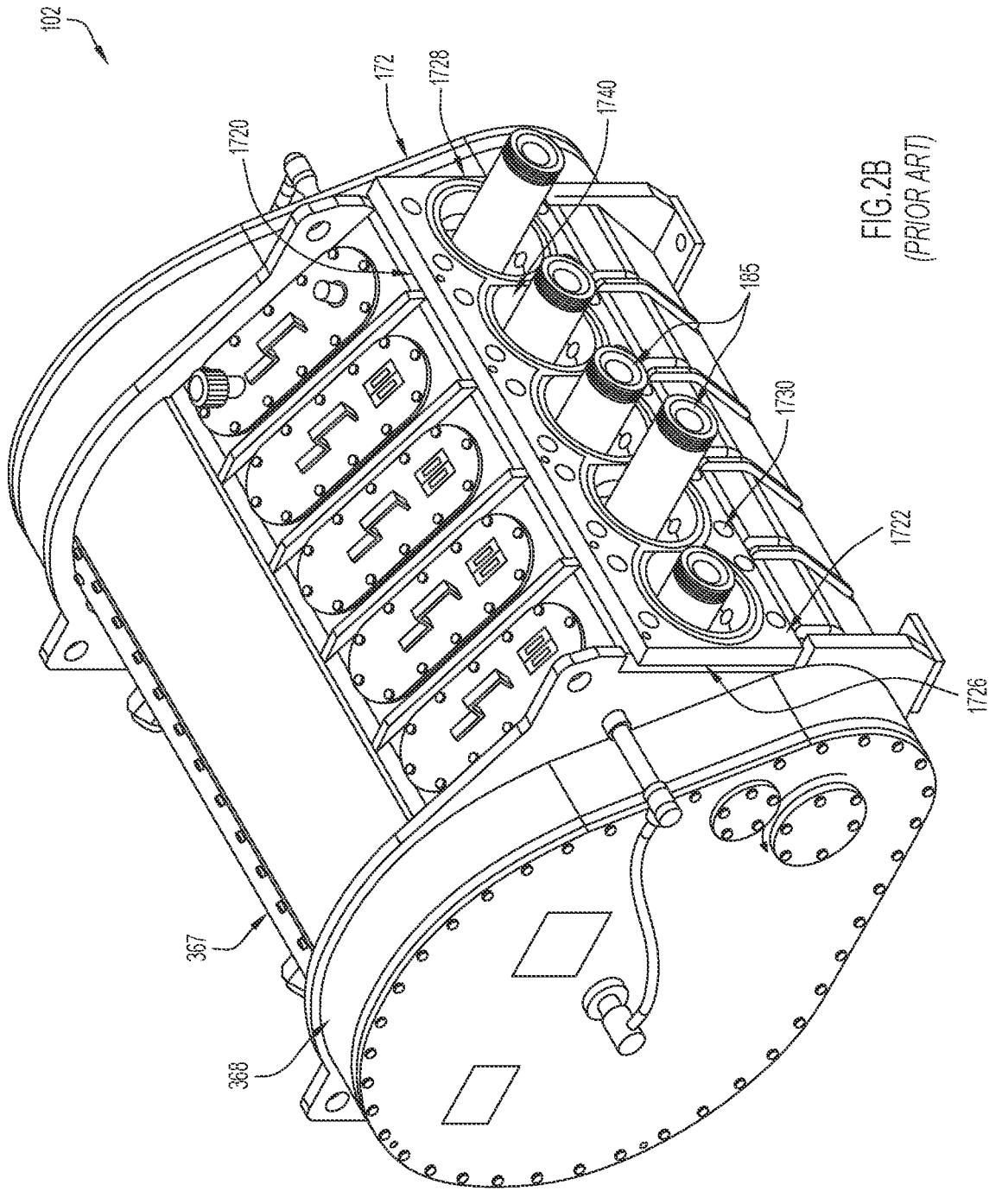
FIG. 2B is a front perspective view of the prior art power end of FIG. 1.

Now turning to FIGS. 2A and 2B, in the depicted prior art reciprocating pump 100, couplers 175 (e.g., tie rods, which are sometimes referred to as stay rods) are threaded to a nose plate 172 of a crosshead assembly 170 of the power end 102 to position the fluid end 104 in close proximity to the power end 102. More specifically, with the prior art power end 102, the locations at which a fluid end 104 may be coupled to the power end 102 are fixed and/or preset by a set of receptacles 1730. In this particular prior art power end 102, the nose plate 172 defines the locations of receptacles 1730 for the power end 102 (which is positioned at and/or generally defines a front of the power end 102). However, in other embodiments, receptacles 1730 could be included in any part or portion of a power end. That is, the power end 102 may include a frame 368 that extends from a front 369 to a back 367, and the receptacles 1730 may generally be included in the front 369 of frame 368. Receptacles 1730 can be seen in FIG. 2B, which shows the power end 102 disconnected from the fluid end 104, e.g., during maintenance of the packing assembly 36 included in the fluid end 104. FIG. 2B also shows how, in this particular embodiment, the nose plate 172 extends from a first end 1726 to a second end 1728 and also extends from a back surface 1720 to a front surface 1722.

In the depicted embodiment, the receptacles 1730 extend into the nose plate 172 from the front surface 1722 and are generally disposed around pony rod holes 1740. However, in other embodiments, the receptacles 1730 need not be positioned as such. In any case, the receptacles 1730 may be threaded so that a threaded coupler 175 can be secured directly therein. Still further, in some instances, receptacles 1730 need not extend through back surface 1720, which may prevent couplers 175 from extending into the crosshead assembly 170 and interfering with operations of the crosshead assembly 170 and/or allowing contaminants into the crosshead assembly 170. However, other embodiments might include receptacles 1730 that are through holes.

Still referring to FIGS. 2A and 2B, in the prior art reciprocating pump 100—and in most high pressure reciprocating pumps-a crosshead frame 174 is a part of a crosshead assembly 170 that converts rotational motion of the crankshaft 103 into linear, reciprocating motion of a pony rod 185. More specifically, the crosshead assembly 170 includes a connecting rod 171, a crosshead 173, and a pony rod 185. The crosshead 173 includes a connector 176 disposed within a crosshead frame 174, and the connecting rod 171 extends from the crankshaft 103 to the connector 176. The connector 176 is configured to move linearly within the crosshead frame 174, and opposite ends of the connecting rod 171 are configured to travel with the crankshaft 103 and the connector 176.

Thus, as the connecting rod 171 rotates with the crankshaft 103, the connecting rod 171 reciprocates the connector 176 within the crosshead frame 174. The connector 176 is also connected to a back side 186 of the pony rod 185 so that the pony rod 185 reciprocates with the connector 176. Meanwhile, a front side 187 of the pony rod 185 can be coupled to a reciprocating element 202 (e.g., a plunger), such as via a clamp, to drive reciprocating motion of the reciprocating element 202 that pumps fluid through the fluid end 104. Notably, during this action, the pony rod 185 and/or the crosshead 173 exert forces on the frame 368. These forces stress the frame 368 (and potentially the crosshead frame 174). Such forces may affect a structural integrity of the frame 368. For this reason, forces imparted onto the frame 368 may wear out (e.g., decrease a useful lifespan of) the frame 368 and/or cause downtime of the power end 102, such as to enable performance of a maintenance operation with respect to the frame 368, thereby reducing effective operation of the pump 100.

Figure 3:
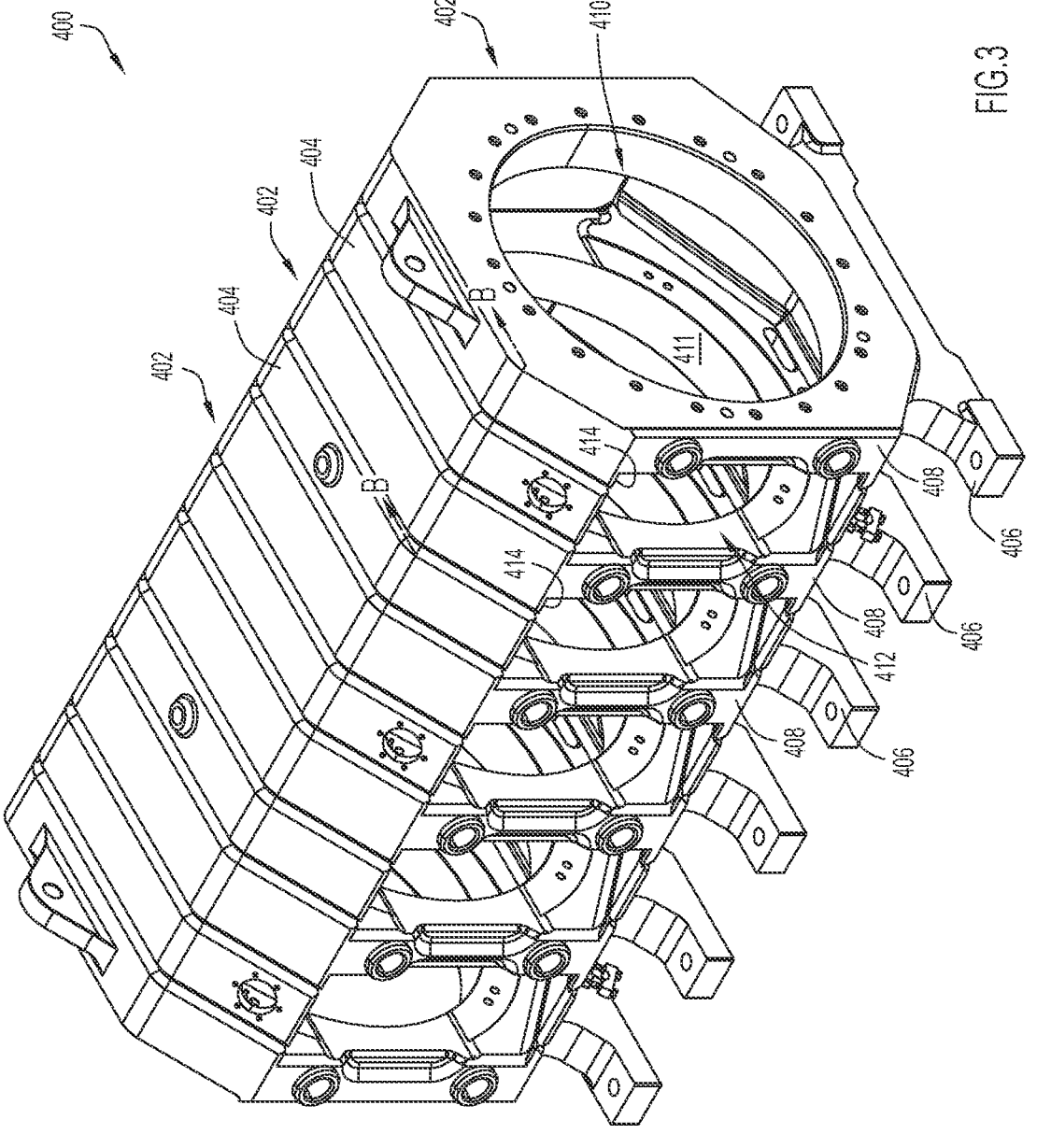
FIG. 3 is a side perspective view of a power end frame of a reciprocating pump, according to an example embodiment of the present application.

FIG. 3 illustrates a side perspective view of a power end frame 400 of a power end of a pump in an assembled configuration. For visualization purposes, certain components, such as a crankshaft, a crosshead assembly, a nose plate, and rods, are not shown in FIG. 3. The power end frame 400 is composed of multiple rings 402 and plates 404 positioned between adjacent rings 402. Each ring 402 includes a stand 406 configured to support and stabilize placement of the rings 402, e.g., on a skid (not shown). For example, the stands 406 help balance and maintain a position of the rings 402, as well as support a weight of the power end frame 400. Each ring 402 also includes a base 408 connected to a corresponding stand 406. Each base 408 defines a respective opening 410 in which components (e.g., a crankshaft) of the power end may be positioned.

The rings 402 are coupled to the plates 404 to form an interior 411 of the power end frame 400. For example, the plates 404 offset adjacent rings 402 from one another in the assembled configuration of the power end frame 400 to form a compartment 412 (e.g., a gap, a space) between the rings 402 such that adjacent rings 402 (e.g., rings 402 coupled to the same plate 404) are not directly in contact with one another. Similarly, adjacent plates 404 (e.g., plates 404 coupled to the same ring 402) are not directly in contact with one another to define the compartments 412. Components of the power end may be positioned within and enclosed by the compartment 412. Thus, the compartments 412 extend between adjacent openings 410 of the rings 402, and the openings 410 and compartments 412 collectively define the interior 411.

The rings 402 also include flanges 414 extending from the base 408. The flanges 414 are configured to abut the plates 404 in the assembled configuration of the power end frame 400. In this manner, the flanges 414 offset the plates 404 from the base 408. That is, the flanges 414 position the plates 404 in a spaced relationship from the base 408. Such arrangement of the plates 404 relative to the rings 402 reduces stress imparted at an interface between the rings 402 and the plates 404, because a joint between a plate 404 and a ring 402 is not formed at a corner of a compartment 412 of the interior 411. More specifically, stress may concentrate at the base 408 (e.g., at where the flange 414 extends from the base 408), rather than at where the flanges 414 engages one of the plates 404. As such, the extension of the flange 414 away from the base 408 causes the rings 402 and plates 404 to be coupled to one another away from where stress may concentrate. Thus, the flanges 414 may help maintain the coupling of the rings 402 and the plates 404 to one another (e.g., by causing stress to concentrate away from this coupling).

The illustrated power end frame 400 includes separate plates 404 positioned at opposite sides/ends (e.g., a top, a bottom) of the power end frame 400 for coupling with the rings 402. Such positioning of the plates 404 defines the compartment 412 extending between opposite rings 402 and opposite plates 404. Additionally, the arrangement of the plates 404 also facilitates ease of coupling the rings 402 and plates 404 to one another. For example, a weld may be applied at interfaces between the rings 402 and plates 404 that abut one another. The extension of the plates 404 along respective sides of the power end frame 400 enables a single, continual weld to be applied to couple a ring 402 and a plate 404 to one another. As an example, because each plate 404 extends along a single side of the power end frame 400, a weld may be more easily applied, such as by moving welding equipment (e.g., using a manual operation, using an automated operation) along the side of the power end frame 400 at which the plate 404 is positioned (e.g., by moving along a single axis or dimension). Thus, separate passes of welding equipment that may otherwise be used to apply a weld (e.g., by moving along multiples axes or dimensions) to a plate extending along multiple sides of the power end frame 400 may be avoided. The ability to sufficiently weld a plate 404 and a ring 402 to one another using a single pass may improve manufacture of the power end frame 400, such as by reducing a time and cost associated with coupling the plates 404 and rings 402 to one another.

Figure 4:
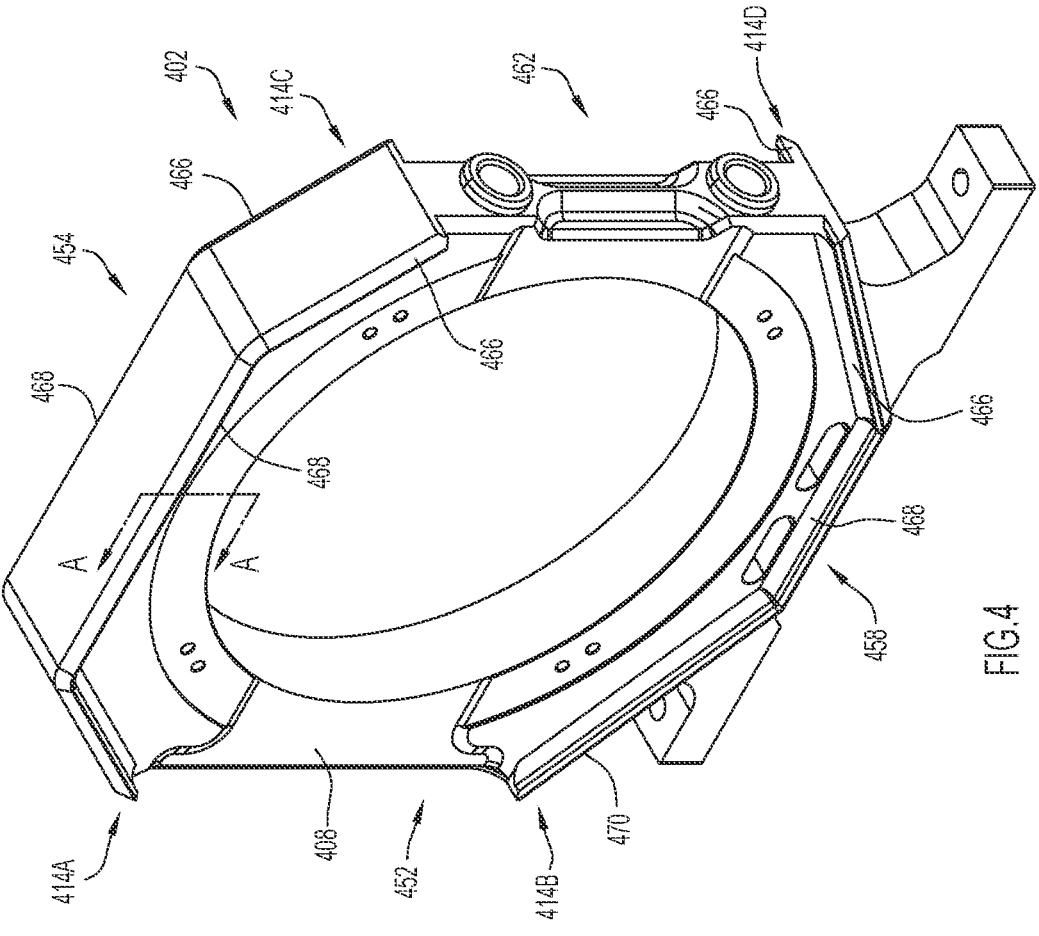
FIG. 4 is a side perspective view of a ring of the power end frame of FIG. 3.

FIG. 4 illustrates a side perspective view of one of the rings 402 of the power end frame 400. The illustrated ring 402 includes: (1) a first flange 414A extending from a first side 452 (e.g., a first lateral side) at a first end 454 (e.g., a top end) of the base 408; (2) a second flange 414B extending from the first side 452 at a second end 458 (e.g., a bottom end) of the base 408; (3) a third flange 414C extending from a second side 462 (e.g., a second lateral side), opposite the first side 452, at the first end 454 of the base 408; and (4) a fourth flange 414D extending from the second side 462 at the second end 458 of the base 408. Each of the flanges 414A, 414B, 414C, 414D is configured to abut and couple to a respective plate 404. In this manner, the illustrated ring 402 is configured to couple to four separate plates 404. However, in other embodiments, the ring 402 includes any suitable quantity of flanges (e.g., two flanges) on any lateral side to couple to a corresponding quantity of plates 404. In fact, end rings 402 (at either lateral side of power end frame 400) of the depicted embodiment include two flanges 414 on one lateral side.

In the depicted embodiment, each flange 414A, 414B, 414C, 414D includes a first portion 466, a second portion 468 extending transversely or crosswise to the first portion 466, and a third portion 470 extending transversely to the second portion 468. For example, the portions 466, 468, 470 are oriented obliquely relative to one another and extend along at least a portion of a perimeter or outer boundary of the ring 402. The portions 466, 468, 470 are configured to abut and secure to corresponding parts of the plates 404.

As discussed, extension of the flanges 414A, 414B, 414C, 414D from the base 408 moves the interface between the flanges 414A, 414B, 414C, 414D and the plates 404 away from where stress may concentrate. For instance, stress generally concentrates at irregular or interrupted geometric features (e.g., corners, bends, twists, or other changes of geometric continuities). The orientation of the flanges 414A, 414B, 414C, 414D relative to the base 408 forms such an irregular geometric feature that enables stress to concentrate at where the flanges 414A, 414B, 414C, 414D extend from the base 408, instead of where the flanges 414A, 414B, 414C, 414D terminate and abut the plates 404. Thus, the effect of stress may be reduced where the rings 402 are coupled to the plates 404. In other words, because stress at the interface between the flanges 414A, 414B, 414C, 414D and the plates 404 is reduced, the stress imparted onto the coupling connecting the flanges 414A, 414B, 414C, 414D to the plates 404 is reduced. For this reason, the integrity of such coupling is improved to maintain securement of the rings 402 and plate 404 to one another and improve durability of the power end frame 400.

Figure 5:
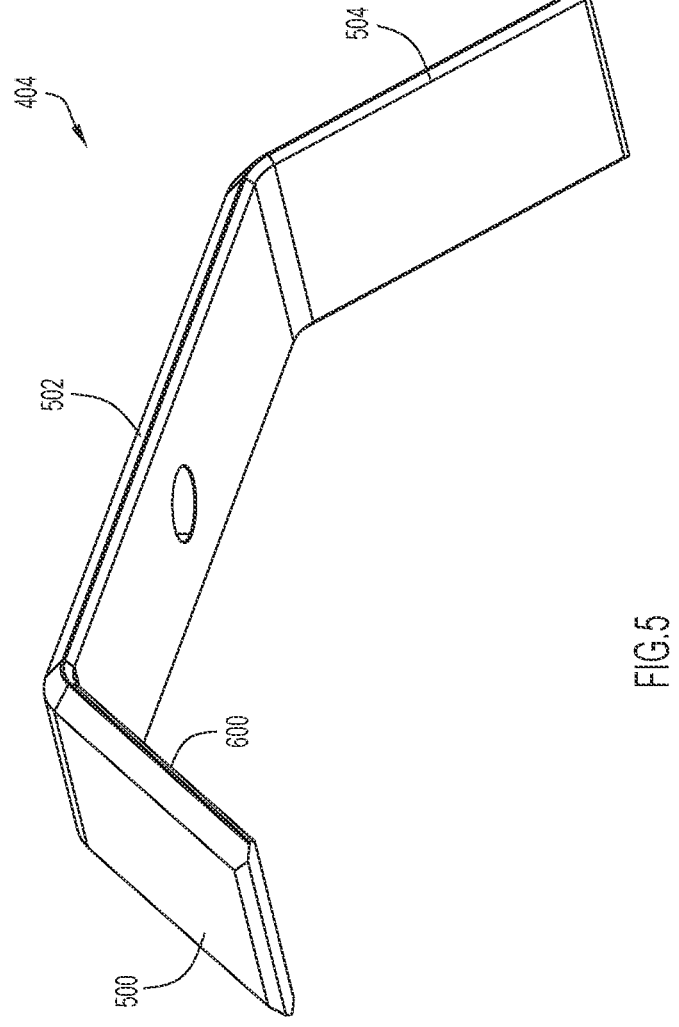
FIG. 5 is a side perspective view of a plate of the power end frame of FIG. 3.

FIG. 5 illustrates a perspective side view of one of the plates 404 of the power end frame 400. The plate 404 includes a first segment 500, a second segment 502 extending transversely from the first segment 500, and a third segment 504 extending transversely from the second segment 502. The segments 500, 502, 504 are also oriented obliquely relative to one another to enable the segments 500, 502, 504 to align with and abut the portions 466, 468, 470 of the flanges. As an example, the first segment 500 is configured to abut the first portion 466, the second segment 502 is configured to abut the second portion 468, and the third segment 504 is configured to abut the third portion 470. Alternatively, the first segment 500 may abut the third portion 470, the second segment 502 is configured to abut the second portion 468, and the third segment 504 is configured to abut the first portion 466. In this manner, the plate 404 has a U-shaped configuration.

The plate 404 includes a lateral surface 600 configured to abut a ring 402. For instance, the lateral surface 600 extends along each of the segments 500, 502, 504 to enable each of the segments 500, 502, 504 to abut the ring 402. The interface at which the lateral surface 600 abuts the ring 402 is offset from a recess to avoid stress from concentrating where the plate 404 and the ring 402 are coupled to one another.

Figure 6:
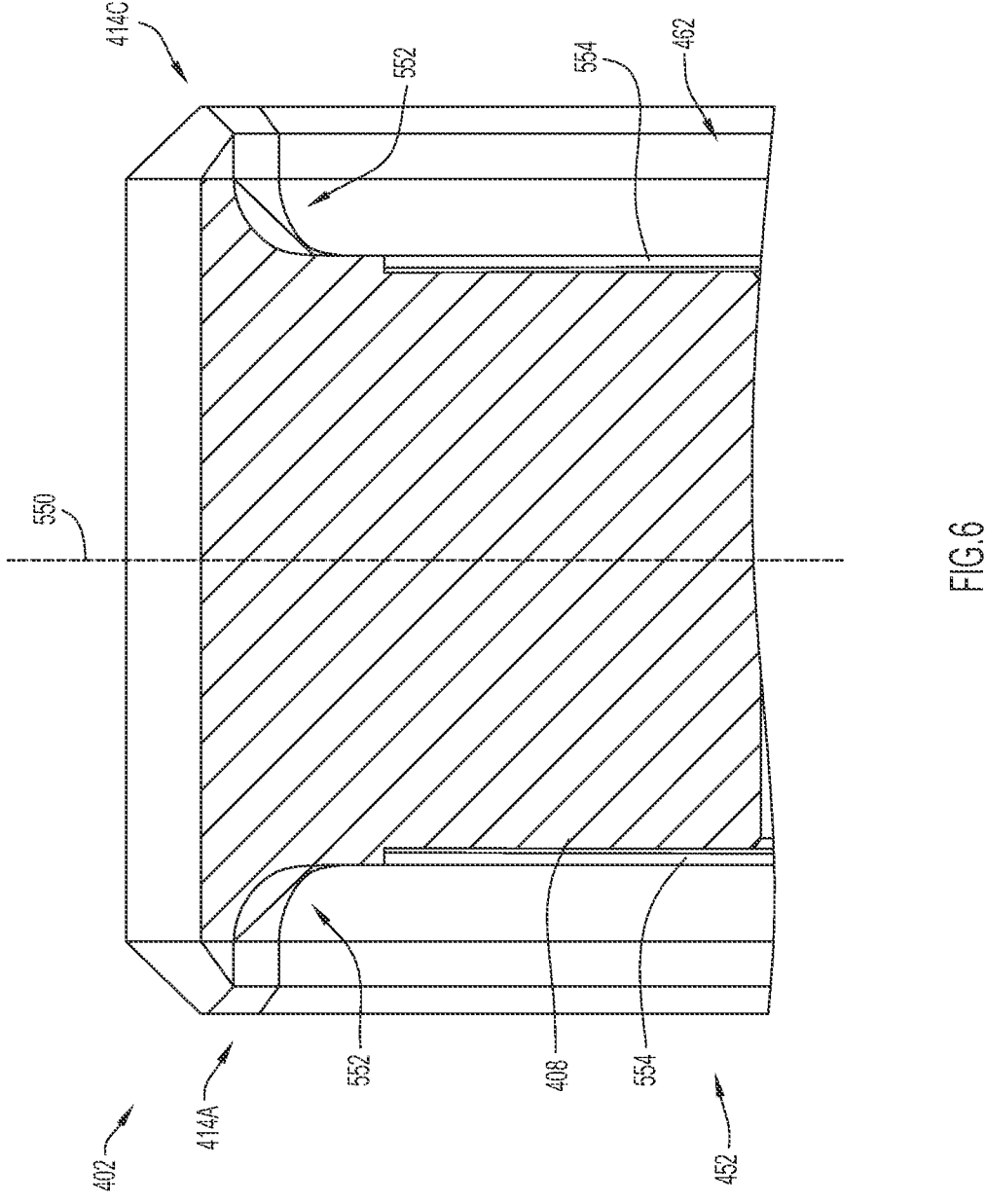
FIG. 6 is a cross-sectional view of the ring of FIG. 4 taken along line A-A of FIG. 4.

FIG. 6 illustrates a cross-sectional view of the ring 402 taken along lines A-A of FIG. 4. The illustrated embodiment shows the first flange 414A and the third flange 414C extending from the base 408, but similar features may also be incorporated with respect to the second flange 414B and the fourth flange 414D extending from the base 408. The first flange 414A and the third flange 414C extend from the base 408 in opposite directions to enable abutment with separate plates 404 positioned at opposite sides 452, 462 of the base 408. Also, the depicted ring 402 is symmetrical about a central axis 550 (e.g., a vertical axis) extending between the sides 452, 462 of the base 408. For example, the ring 402 has a T-shaped configuration. However, in other embodiments, the ring 402 may be asymmetrical about the central axis 550.

As shown in FIG. 6, each of the flanges 414A, 414C cooperates with the base 408 to define a respective recess 552. The recess 552 includes a curve or bend, in which stress may concentrate. That is, the recess 552 interrupts the geometric continuity of a base surface 554 of the base 408 to cause stress to be distributed onto the recess 552. By comparison, the base surface 554 and an interface between the flanges 414A, 414C and a corresponding plate 404, both of which may be flat, continuous surfaces, may experience less stress.

Figure 7:
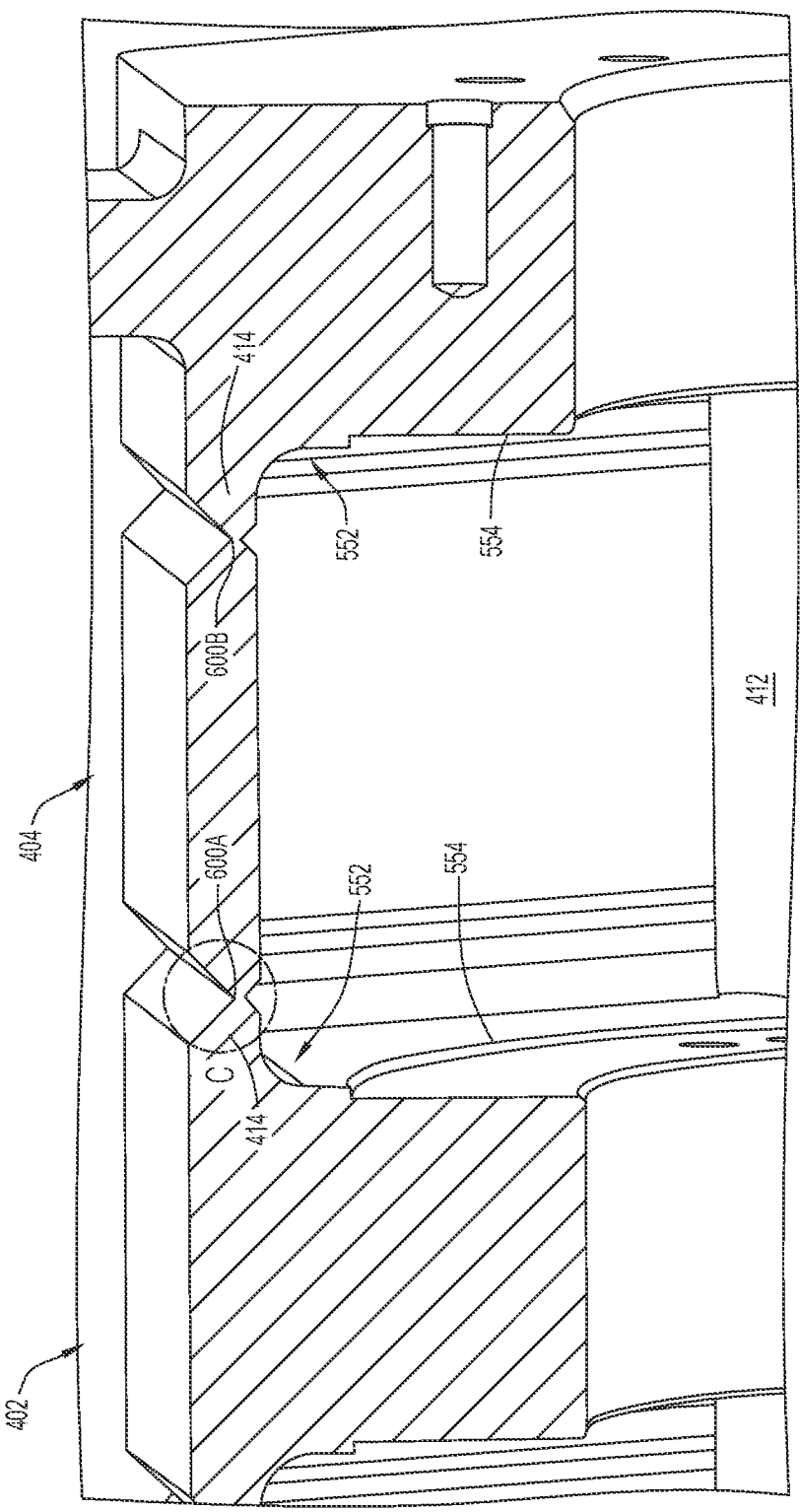
FIG. 7 is a cross-sectional view of the power end frame of FIG. 3 taken along line B-B of FIG. 3.

FIG. 7 illustrates a cross-sectional view of the power end frame 400 taken along lines B-B of FIG. 3 to illustrate coupling of a plate 404 to two rings 402 in the assembled configuration of the power end frame 400. The rings 402 are coupled to opposite sides of the plate 404. For example, one of the rings 402 abuts against a first lateral surface 600A of the plate 404, and another of the rings 402 abuts against a second lateral surface 600B, opposite the first lateral surface 600A, of the plate 404. Thus, the plate 404 is offset from base surfaces 554 of both rings 402.

Coupling of the rings 402 and the plate 404 to one another forms the compartment 412 of the power end frame 400 between the rings 402, and various other components of the power end frame 400 may be positioned within and enclosed by the compartment 412. In the assembled configuration of the power end frame 400, the base surfaces 554 are positioned within and face the compartment 412. Therefore, the base surfaces 554 may be subject to forces that produce stress within the compartment 412. For example, force imparted onto the base surfaces 554 may be transferred to produce stress that concentrates at the recesses 552. However, the flanges 414 position the plate 404 away from the recesses 552. In other words, the locations at which the plate 404 abuts against the respective flanges 414 are away from the recesses 552. For this reason, stress concentrated within the compartment 412 may not affect the interface between the plate 404 and the flanges 414. Thus, stress at the coupling of the plate 404 with the rings 402 at the flanges 414 may be reduced to maintain the securement of the plate 404 with the rings 402.

Figure 8:
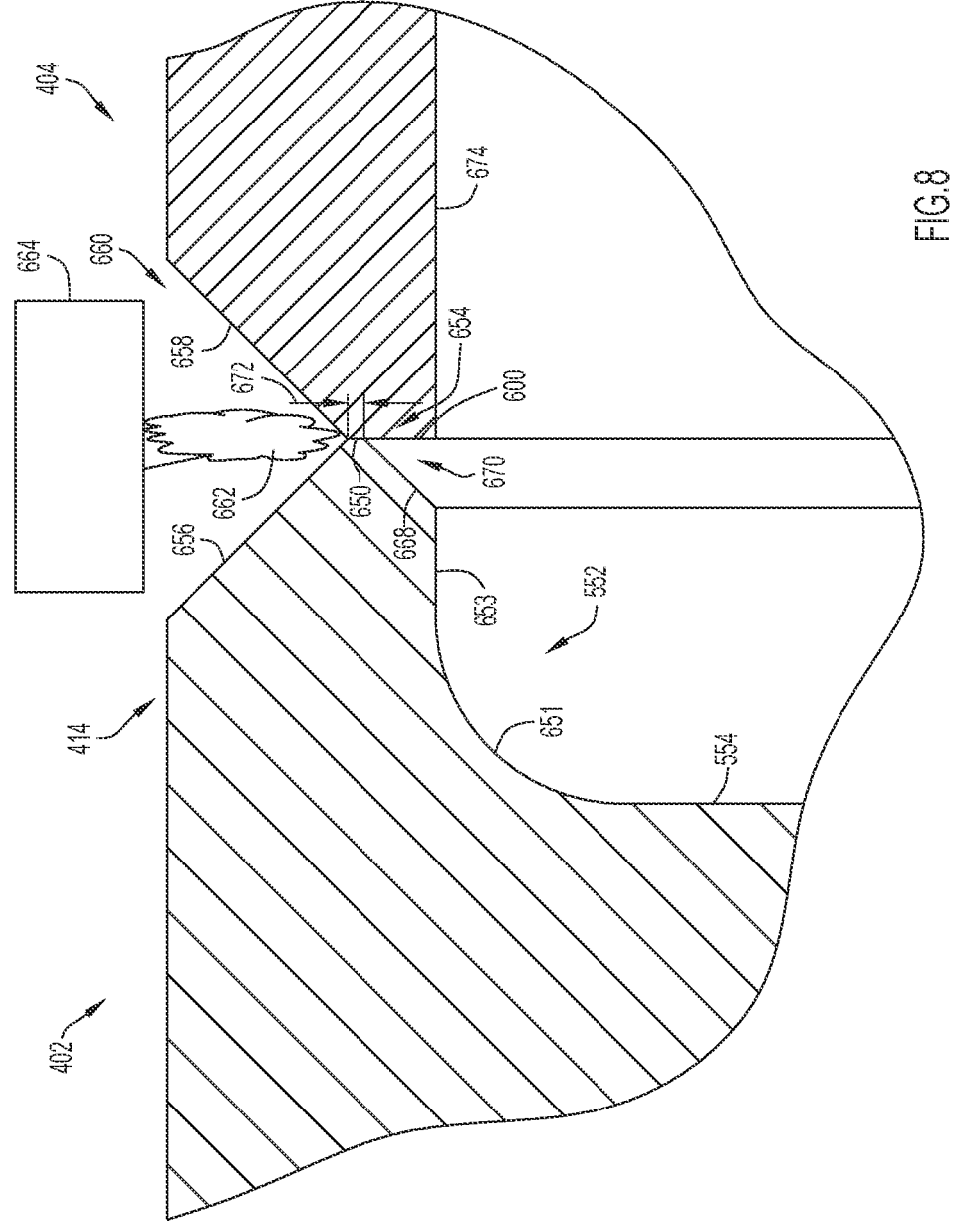
FIG. 8 is a detailed view of a portion of FIG. 7, showing detail C from FIG. 7.

FIG. 8 illustrates a detailed view of a portion of the power end frame 400, showing detail C from FIG. 7 to depict additional details regarding the interface between one of the rings 402 and one of the plates 404 in the assembled configuration of the power end frame 400. In particular, an interface surface 650 of the flange 414 of the ring 402 abuts against a lateral surface 600 of the plate 404 at an interface location 654. For example, the interface surface 650 and the lateral surface 600 planarly align with and are positioned flush against one another. Such engagement between the ring 402 and the plate 404 offsets the plate 404 from the base surface 554 and away from the recess 552. As an example, the flange 414 includes an arcuate portion 651 extending from the base surface 554, as well as an extended portion 653 extending from the arcuate portion 651 away from the base surface 554 and toward the interface surface 650. The arcuate portion 651 and the extended portion 653 offset the interface surface 650 from the base surface 554, and the extended portion 653 extends the interface surface 650 into abutment with the plate 404, away from the recess 552. As such, stress that concentrates at the recess 552 is not imparted at the interface location 654.

In the illustrated embodiment, the flange 414 of the ring 402 includes an exterior ring surface 656 extending obliquely to the interface surface 650, and the plate 404 includes an exterior plate surface 658 extending obliquely to the lateral surface 600. That is, the exterior ring surface 656 and the exterior plate surface 658 taper toward the interface location 654. Then, when the interface surface 650 and the lateral surface 600 abut, the exterior ring surface 656 and the exterior plate surface 658 will be adjacent to one another and extend transversely to one another (e.g., at an acute angle, such as 45 degrees, or at a right angle). Thus, the exterior ring surface 656 and the exterior plate surface 658 cooperatively define an exterior groove 660 in the assembled configuration of the power end frame 400. However, the exterior groove 660 need not by V-shaped at a particular angle and may comprise a bevel-groove, a U-groove, a V-groove, an irregularly shaped groove, or any combination thereof. Additionally or alternatively, the exterior groove 660 need not be formed by the exterior ring surface 656 and the exterior plate surface 658. For example, in other embodiments, one of the exterior ring surface 656 and the exterior plate surface 658 could form the exterior groove 660. In any case, the exterior groove 660 formed by the interface between the lateral surface 600 and the exterior ring surface 656 facilitates coupling of the ring 402 and the plate 404 to one another. That is, the exterior groove 660 is configured to receive material that secures the ring 402 and the plate 404 to one another.

For instance, a weld 662 may be applied into the exterior groove 660 and fill the exterior groove 660 to couple the ring 402 and the plate 404 to one another. In fact, in some instances, the weld 662 may fully penetrate at least a portion of the interface location 654, deforming or eliminating groove 660. Thus, in some instances, the groove 660 described herein may exist during a manufacturing process or portions of the manufacturing process and be filled after the manufacturing process has been completed. Additionally or alternatively, other features, such as an adhesive, may be applied into the exterior groove 660 to couple the ring 402 and the plate 404 to one another. In such instances, the groove 660 may be found in the power end frame 400 after manufacturing is complete.

In some embodiments where a weld 662 is applied to groove 660, the weld 662 is manually applied (e.g., by a welder, by a technician). In additional or alternative embodiments, the weld 662 is automatically applied. For example, an automated welding system 664 may configured to operate and deliver the weld 662 into the exterior groove 660. In fact, the specific geometry and positioning of the interface location 654 may enable an automated welding system 664 to travel around the entire power end frame 400 and weld one or more plates 404 to a ring in a single pass. For example, a power end frame 400 might be positioned with its front face on a support surface, and the automated welding system 664 could travel around the power end frame, welding a first plate 404 to the flange 414A and a second plate 404 to the flange 414B in a single welding pass. That said, the ring 402 and the plate 404 can be coupled together using any suitable technique facilitated by the engagement between the interface surface 650 of the ring 402 and the lateral surface 600 of the plate 404. In either case, the weld 662 applied into the exterior groove 660 is positioned away from the recess 552. Thus, stress that concentrates at the recess 552 may not be imparted onto the weld 662, thereby increasing securement provided by the weld 662 to maintain the coupling of the ring 402 and the plate 404 to one another.

In the depicted embodiment, the flange 414 of the ring 402 also includes an interior ring surface 668 extending obliquely from the extended portion 653 to the interface surface 650 in the illustrated embodiment. For example, the interior ring surface 668 and the lateral surface 600 cooperatively define an interior groove 670. The interior ring surface 668 reduces a dimension 672 (e.g., a height, a thickness) of the interface surface 650 that is in abutment with the lateral surface 600 (i.e., the interior ring surface 668 tapers towards the interface surface 650). The reduced dimension 672 of the interface surface 650 may enable the weld 662 to fully penetrate the material at the interface location 654, so that the weld 662 extends from the exterior groove 660 to the interior groove 670. In other words, the weld 662 is able to pass between the interface surface 650 and the lateral surface 600 and span across the reduced dimension 672, thereby contacting both the exterior and the interior of the ring 402 and plate 404.

Consequently, a single weld 662 may sufficiently contact both the ring 402 and the plate 404 to apply a desirable force that secures the ring 402 and the plate 404 to one another, meeting industry standards for such welding. That is, the weld 662 may be applied at the exterior groove 660 and penetrate into the interior groove 670 to sufficiently couple the ring 402 and the plate 404 to one another without having to apply separate welds to the exterior groove 660 and the interior groove 670. This may especially be important to improve the time and expense associated with operations to couple the ring 402 and the plate 404 (e.g., via the weld 662) is improved. Most notably, by eliminating interior welding, the power end frame 400 may be assembled with fully automated welders that act on exterior surfaces of the power end frame 400. This may significantly reduce the time and expense to manufacture the power end frame 400 (e.g., as opposed to techniques that utilize an exterior welding operation, a separate interior welding operation, and an additional finishing operation).

In the illustrated embodiment, the extended portion 653 is aligned with (e.g., coplanar to, collinear with) an interior plate surface 674. The alignment of the extended portion 653 and the interior plate surface 674 with one another may further reduces stress that concentrates at the interface location 654. For example, the orientation of the extended portion 653, the interior plate surface 674, and the weld 662 that penetrates into the interior groove 670 may form a geometric continuity that reduces stress concentration at the interface location 654, further increasing securement provided by the weld 662. However, in other embodiments, the interior plate surface 674 may be tapered like the interior ring surface 668, either with a matching taper or a taper having a different size and/or geometry.

Figure 9:
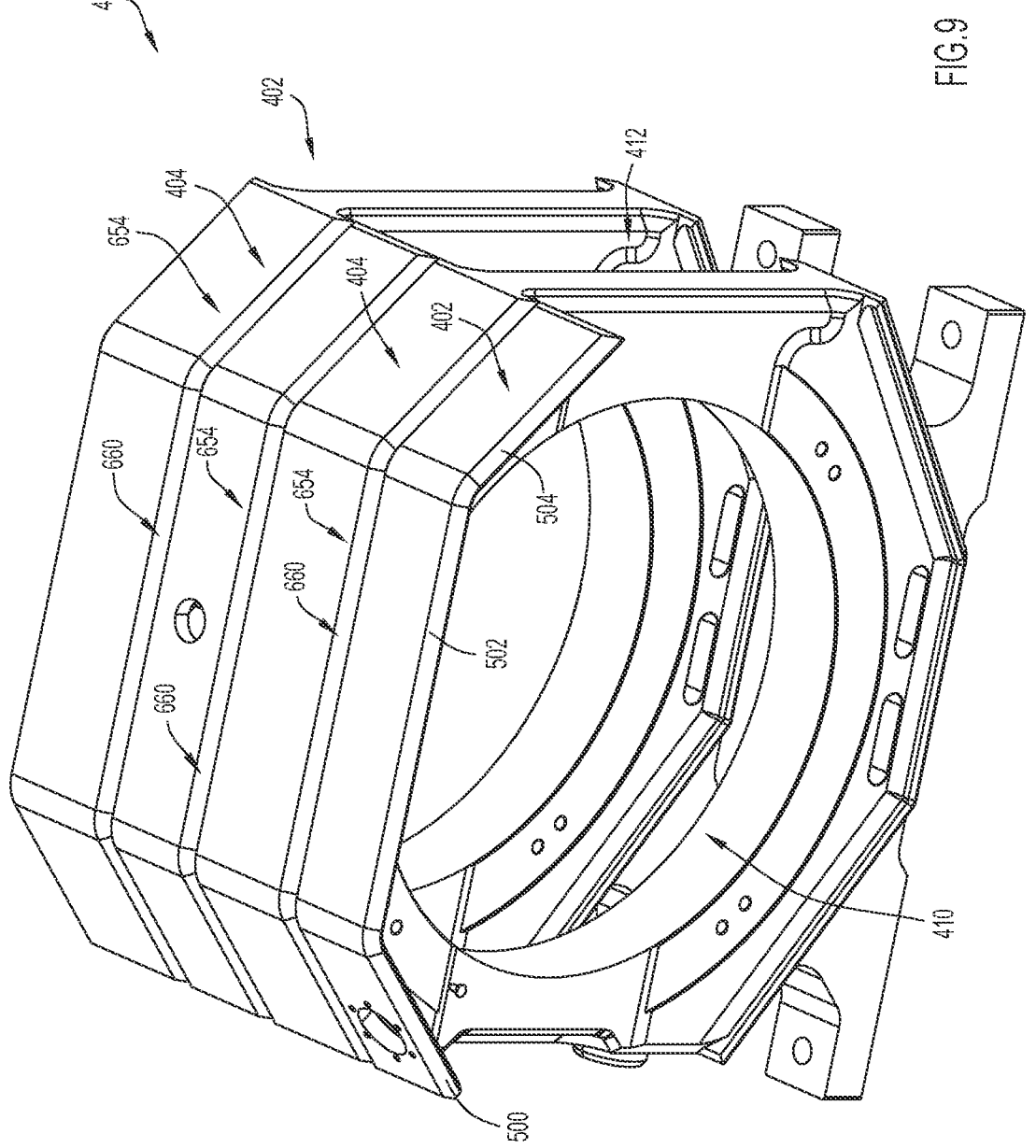
FIG. 9 is a top perspective view of the power end frame of FIG. 3.

FIG. 9 illustrates a top perspective view of a portion of the power end frame 400 in which rings 402 and plates 404 abut one another. In the illustrated embodiment, each of the first segment 500, the second segment 502, and the third segment 504 of the plate 404 is in abutment with a corresponding portion of the ring 402 (e.g., the interface surface 650 of the flange 414 of the ring 402). Thus, the exterior groove 660 extends continually along the first segment 500, the second segment 502, and the third segment 504. Thus, the weld 662 applied within the exterior groove 660 may also continually extend along an outer boundary of the first segment 500, the second segment 502, and the third segment 504. In other words, the weld 662 may be in continual contact with the first segment 500, the second segment 502, and the third segment 504. Consequently, the weld 662 applied to couple the ring 402 and the plate 404 to one another may be absent of geometric discontinuities that would otherwise cause stress concentration, thereby further reducing stress concentration at the interface location 654.

Additionally, a single, continuous weld 662 may be applied along the first segment 500, the second segment 502, and the third segment 504 to improve ease of operation to couple the ring 402 and the plate 404 to one another. For example, a single operation to apply the weld 662 along the first segment 500, the second segment 502, and the third segment 504, instead of multiple operations to apply separate welds (e.g., staggered first segment 500, the second segment 502, and the third segment 504), may be performed to couple the ring 402 and the plate 404 to one another. Moreover, in some instances, the same welding pass may continue around the power end frame 400 to couple like segments of another plate 404 to ring 402 (e.g., at another flange on the same lateral side). In any case, the weld 662 may be continually applied from an exterior of the power end frame 400 to sufficiently couple the ring 402 and the plate 404 to one another without having to apply additional, separate welds, such as from an interior of the power end frame 400. Since the exterior of the power end frame 400 may be readily exposed and easily accessible, e.g., as compared to the interior of the power end frame 400 (e.g., from the opening 410, from the compartment 412), which may not readily exposed and easily accessible, it is much more efficient to weld exteriorly. In fact, such welding can be completed with automated welding processes. And forming the entire power end frame 400 with automated welding processes may eliminate tedious and expensive manual welding processes, while also eliminating potential welding deviations/variations associated therewith (e.g., variations in penetration, deposition, etc.) that may otherwise be caused by manual welding processes.

Figure 10:
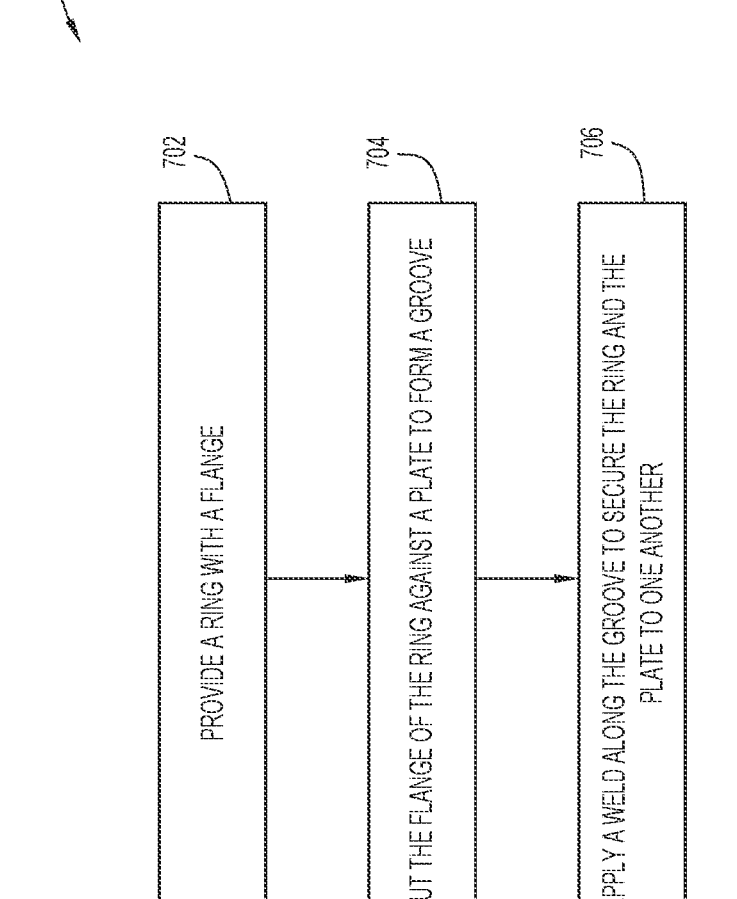
FIG. 10 is a flowchart of a method of manufacture of a power end frame, according to an example embodiment of the present application.

FIG. 10 is a flowchart of a method 700 of manufacture of the power end frame 400. In particular, the method 700 depicts coupling of the ring 402 and the plate 404 to one another. It should be noted that the method 700 may be performed differently in additional or alternative embodiments. For example, an additional operation may be performed, and/or any of the operations of the method 700 may be performed differently, performed in a different order, or removed altogether.

At block 702, the ring 402 having the flange 414 is provided. For example, the flange 414 includes the arcuate portion 651 extending from the base surface 554 of the ring 402, as well as the extended portion 653 extending from the arcuate portion 651 and offsetting the interface surface 650 away from the base surface 554. Additionally, the flange 414 may include the exterior ring surface 656 and the interior ring surface 668 that extend obliquely relative to the interface surface 650.

At block 704, the flange 414 of the ring 402 is placed in abutment with the plate 404 to form the exterior groove 660. For instance, the interface surface 650 of the ring 402 is positioned flush against the lateral surface 600 of the plate 404. The plate 404 may include the exterior plate surface 658 extending obliquely relative to the lateral surface 600 and oriented transversely relative to the exterior ring surface 656 while the ring 402 and the plate 404 are in abutment with one another. In such instances, the exterior ring surface 656 and the exterior plate surface 658 cooperatively form the exterior groove 660. The interior ring surface 668 may also be oriented transversely relative to the lateral surface 600 while the ring 402 and the plate 404 abut one another. Thus, the interior ring surface 668 and the lateral surface 600 may cooperatively form the interior groove 670.

At block 706, the weld 662 is applied in and along the exterior groove 660 to secure the ring 402 and the plate 404 to one another. For example, the weld 662 may be applied along an outer boundary of the flange 414 of the ring 402 and along an outer boundary of the first segment 500, the second segment 502, and the third segment 504 of the plate 404. In some embodiments, a single, continuous weld 662 is applied along the ring 402 and along the plate 404 to avoid geometric discontinuities and reduce stress concentrations to improve securement of the ring 402 and the plate 404 to one another. The weld 662 applied into the exterior groove 660 may penetrate through the interface between the ring 402 and the plate 404 and into the interior groove 670 to increase contact with the ring 402 and with the plate 404, thereby providing further securement of the ring 402 and the plate 404 to one another.

In some embodiments, the method 700 may further comprise securing two plates 404 to a ring 402. For example, block 702 may include providing a ring 402 with two flanges 414, block 704 may include abutting two plates 404 to the two flanges 414 to form two grooves 660, and block 706 may apply a weld 662 along both grooves 660. Additionally or alternatively, the method 700 may be repeated for securement of multiple rings 402 and/or multiple plates 404. For example, the method 700 may couple a first ring 402 to a first side of the plate 404, and the method 700 may be performed to couple a second ring 402 to a second side, opposite the first side, of the plate 404. Similarly, the method 700 may couple one or more first plates 404 to a first side of the ring 402, and the method 700 may be performed to couple one or more second plates 404 to a second side, opposite the first side, of the ring 402.

While the disclosure has been illustrated and described in detail and with reference to specific embodiments thereof, it is nevertheless not intended to be limited to the details shown, since it will be apparent that various modifications and structural changes may be made therein without departing from the scope and within the scope and range of equivalents of the claims. In addition, various features from one of the embodiments may be incorporated into another of the embodiments. Accordingly, it is appropriate that the appended claims be construed broadly and in a manner consistent with the scope of the disclosure as set forth in the following claims.

Similarly, it is intended that the present disclosure cover the modifications and variations of this disclosure that come within the scope of the appended claims and their equivalents. For example, it is to be understood that terms such as "left," "right," "top," "bottom," "front," "rear," "side," "height," "length," "width," "upper," "lower," "interior," "exterior," "inner," "outer" and the like as may be used herein, merely describe points of reference and do not limit the present disclosure to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the disclosure.

Finally, when used herein, the term "comprises" and its derivations (such as "comprising", etc.) should not be understood in an excluding sense, that is, these terms should not be interpreted as excluding the possibility that what is described and defined may include further elements, steps, etc. Meanwhile, when used herein, the term "approximately" and terms of its family (such as "approximate," etc.) should be understood as indicating values very near to those which accompany the aforementioned term. That is to say, a deviation within reasonable limits from an exact value should be accepted, because a skilled person in the art will understand that such a deviation from the values indicated is inevitable due to measurement inaccuracies, etc. The same applies to the terms "about" and "around" and "substantially."

What is claimed is:

1. A power end frame of a reciprocating pump, comprising:

a plate; and a ring configured to couple to the plate in an assembled configuration of the power end frame, wherein the ring and the plate cooperatively define a compartment of an interior of the power end frame configured to enclose a portion of a crankshaft of a power end of the reciprocating pump, wherein the ring comprises a base surface and a flange, the base surface faces the compartment of the power end frame, and the flange comprises:

an arcuate portion extending from the base surface; and an extended portion extending from the arcuate portion such that the ring is curved from the base surface to the extended portion, wherein an interior surface of the extended portion defines at least a portion of the compartment, an exterior surface of the extended portion is disposed opposite the interior surface, and the interior surface and the exterior surface are tapered toward one another to form an interface surface extending therebetween, and the interface surface is configured to abut the plate in the assembled configuration.

2. The power end frame of claim 1, wherein the plate and the flange of the ring cooperatively form a groove configured to receive a weld to couple the plate and the ring to one another.

3. The power end frame of claim 2, wherein the groove is positioned at an exterior of the power end frame.

4. The power end frame of claim 2, wherein the plate comprises:

a lateral surface configured to abut the interface surface of the flange in the assembled configuration of the power end frame; and an additional exterior surface extending to the lateral surface and forming a portion of the groove.

5. The power end frame of claim 4, wherein the exterior surface of the flange and the additional exterior surface of the plate cooperatively form the groove.

6. The power end frame of claim 1, comprising an additional ring configured to couple to the plate in the assembled configuration of the power end frame, the additional ring comprises an additional base surface and an additional flange extending from the additional base surface such that an additional interface surface of the additional flange is offset from the additional base surface, the additional base surface faces the compartment of the power end frame, and the additional interface surface is configured to abut the plate in the assembled configuration.

7. The power end frame of claim 6, wherein the ring and the additional ring are not in contact with one another in the assembled configuration of the power end frame.

8. The power end frame of claim 1, wherein the base surface and the flange cooperatively form a recess in the compartment of the power end frame, and the flange offsets the plate from the recess.

9. The power end frame of claim 1, wherein the plate comprises a first segment and a second segment extending from the first segment, and each of the first segment and the second segment of the plate abuts the interface surface of the flange of the ring in the assembled configuration of the power end frame.

10. A method of manufacture of a power end frame of a reciprocating pump, comprising:

providing a ring with a flange, wherein the ring comprises a base surface facing a compartment of the power end frame, the flange comprises an arcuate portion extending from the base surface, an extended portion comprising an interior surface defining at least a portion of the compartment and an exterior surface opposite the interior surface, an interface surface extending from the interior surface to the exterior surface, and the interior surface and the exterior surface extend obliquely toward one another to the interface surface to reduce a dimension of the interface surface;

abutting the interface surface of the flange of the ring against a plate such that the plate is offset from the base surface of the ring; and applying a weld along the flange to penetrate the interface surface to secure the ring and the plate to one another.

11. The method of claim 10, wherein the interface surface extends linearly from the interior surface to the exterior surface.

12. The method of claim 10, wherein the plate comprises a first segment and a second segment extending transversely from one another, and abutting the flange of the ring against the plate comprises abutting the first segment and the second segment of the plate against the interface surface of the flange of the ring.

13. The method of claim 12, wherein applying the weld along the flange comprises applying the weld along an outer boundary of the first segment and of the second segment.

14. The method of claim 10, wherein the plate comprises a lateral surface, abutting the interface surface of the flange of the ring against the plate comprises abutting the interface surface against the lateral surface, and applying the weld along the flange comprises applying the weld to penetrate the interface surface and the lateral surface.

15. The method of claim 14, wherein the plate comprises an additional exterior surface extending obliquely from the lateral surface such that abutting the interface surface of the ring against the lateral surface of the plate forms an exterior V-shaped groove with the exterior surface of the ring and the additional exterior surface of the plate, and applying the weld along the flange comprises applying the weld within the exterior V-shaped groove to penetrate the interface surface and the lateral surface.

16. The method of claim 10, wherein abutting the interface surface of the flange of the ring against the plate comprises abutting the interface surface of the flange of the ring against a first lateral surface of the plate, and the method comprises:

abutting an additional interface surface of an additional flange of an additional ring against a second lateral surface, opposite the first lateral surface, of the plate; and applying another weld along the additional flange to penetrate the additional interface surface and the second lateral surface to secure the additional ring and the plate to one another.

17. A ring of a power end frame of a reciprocating pump, the ring comprising:

a base surface; and a flange comprising:

an arcuate portion extending from the base surface to form a recess positioned in a compartment of an interior of the power end frame;

an extended portion extending from the arcuate portion, wherein the extended portion comprises an interior surface defining at least a portion of the compartment, and the extended portion comprises an exterior surface opposite the interior surface: and an interface surface at where the interior surface and the exterior surface meet, wherein the interface surface is configured to abut a plate of the power end frame, the interface surface is offset from the base surface via the flange, and the interior surface and the exterior surface are slanted toward one another to reduce a dimension of the interface surface, which enables a weld being applied at the flange to penetrate the interface surface to secure the ring to the plate.

18. The ring of claim 17, wherein the exterior surface is configured to receive the weld applied to secure the ring to the plate.

19. The ring of claim 17, wherein each of the arcuate portion and the extended portion is linearly slanted.

20. The ring of claim 19, wherein the interface surface extends linearly between the interior surface and the exterior surface.

* * * * *